US010581601B2

(12) United States Patent
Ramoutar

(10) Patent No.: US 10,581,601 B2
(45) Date of Patent: Mar. 3, 2020

(54) SECURE WIRELESS COMMUNICATION DEVICE AND METHOD

(71) Applicant: Vincent Ramoutar, Pickering (CA)

(72) Inventor: Vincent Ramoutar, Pickering (CA)

(73) Assignee: Vincent Ramoutar, Pickering, Ontario (CA)

( * ) Notice: Subject to any disclaimer, the term of this patent is extended or adjusted under 35 U.S.C. 154(b) by 296 days.

(21) Appl. No.: 15/814,865

(22) Filed: Nov. 16, 2017

(65) Prior Publication Data

US 2018/0077124 A1   Mar. 15, 2018

Related U.S. Application Data

(63) Continuation of application No. PCT/CA2017/000066, filed on Mar. 23, 2017.

(60) Provisional application No. 62/312,768, filed on Mar. 24, 2016.

(51) Int. Cl.
| | |
|---|---|
| *H04L 29/06* | (2006.01) |
| *H04L 9/08* | (2006.01) |
| *H04W 4/80* | (2018.01) |
| *H04W 12/06* | (2009.01) |
| *H04W 12/00* | (2009.01) |
| *H04W 12/04* | (2009.01) |

(52) U.S. Cl.
CPC .......... *H04L 9/0869* (2013.01); *H04L 9/0822* (2013.01); *H04L 9/0861* (2013.01); *H04L 9/0891* (2013.01); *H04L 63/0428* (2013.01); *H04L 63/067* (2013.01); *H04W 4/80* (2018.02); *H04W 12/003* (2019.01); *H04W 12/06* (2013.01); *H04L 63/0876* (2013.01); *H04L 2209/805* (2013.01); *H04W 12/00512* (2019.01); *H04W 12/04* (2013.01)

(58) Field of Classification Search
CPC ..... H04W 12/003; H04W 12/04; H04W 4/80; H04L 9/0861; H04L 9/0869; H04L 63/0428; H04L 63/0876
See application file for complete search history.

(56) References Cited

U.S. PATENT DOCUMENTS

| | | | | |
|---|---|---|---|---|
| 6,005,945 A | * | 12/1999 | Whitehouse | ....... G07B 17/0008 380/51 |
| 8,112,066 B2 | | 2/2012 | Ayed | |
| 2010/0167646 A1 | * | 7/2010 | Alameh | .................. G06F 3/017 455/41.2 |

(Continued)

*Primary Examiner* — Sher A Khan

(74) *Attorney, Agent, or Firm* — Kagen Binder, PLLC

(57) ABSTRACT

The present invention provides a secure wireless device and a method for secure wireless communication between a secure wireless device and a mobile device using NFC. The devices have a common seed value, which may be provided to the secure wireless device by the mobile device when they are is physical contact. During contact the mobile device sends a pairing request and credentials to the secure device. After the credentials are validated, the devices are paired and can exchange encrypted messages via a suitable wireless interface such as Bluetooth, the messages being encrypted initially based on the common seed value and the encryption key being regenerated by each device after message transmission by the secure device and reception by the mobile device. The secure device stores confidential data, which can be sent in encrypted messages to the mobile device.

14 Claims, 10 Drawing Sheets

(56) References Cited

U.S. PATENT DOCUMENTS

| | | | |
|---|---|---|---|
| 2011/0165896 A1* | 7/2011 | Stromberg | G06Q 20/32 |
| | | | 455/466 |
| 2011/0215921 A1* | 9/2011 | Ben Ayed | H04B 7/00 |
| | | | 340/539.11 |
| 2012/0254031 A1* | 10/2012 | Walker | G06Q 20/3278 |
| | | | 705/42 |
| 2012/0314865 A1* | 12/2012 | Kitchen | H04L 9/0877 |
| | | | 380/270 |
| 2014/0073300 A1* | 3/2014 | Leeder | H04B 5/0031 |
| | | | 455/416 |
| 2014/0148094 A1* | 5/2014 | Park | G06Q 50/01 |
| | | | 455/41.1 |
| 2014/0275876 A1* | 9/2014 | Hansen | A61B 5/0022 |
| | | | 600/323 |
| 2015/0004903 A1* | 1/2015 | Lyman | H04W 4/80 |
| | | | 455/41.1 |
| 2015/0222517 A1* | 8/2015 | McLaughlin | H04L 9/3247 |
| | | | 713/156 |
| 2015/0236756 A1* | 8/2015 | Ballesteros | H04B 5/02 |
| | | | 455/41.1 |

* cited by examiner

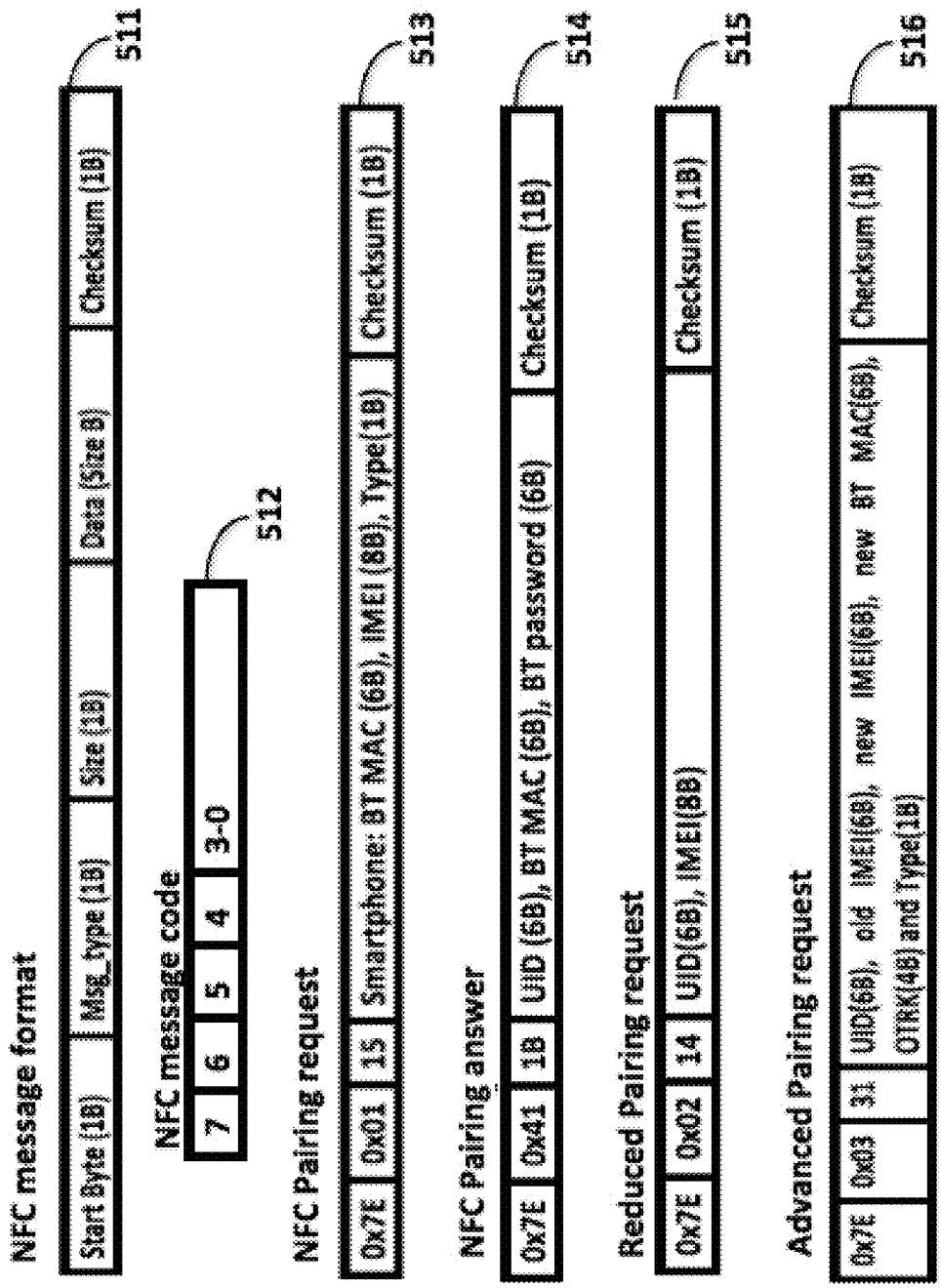
Fig — 5

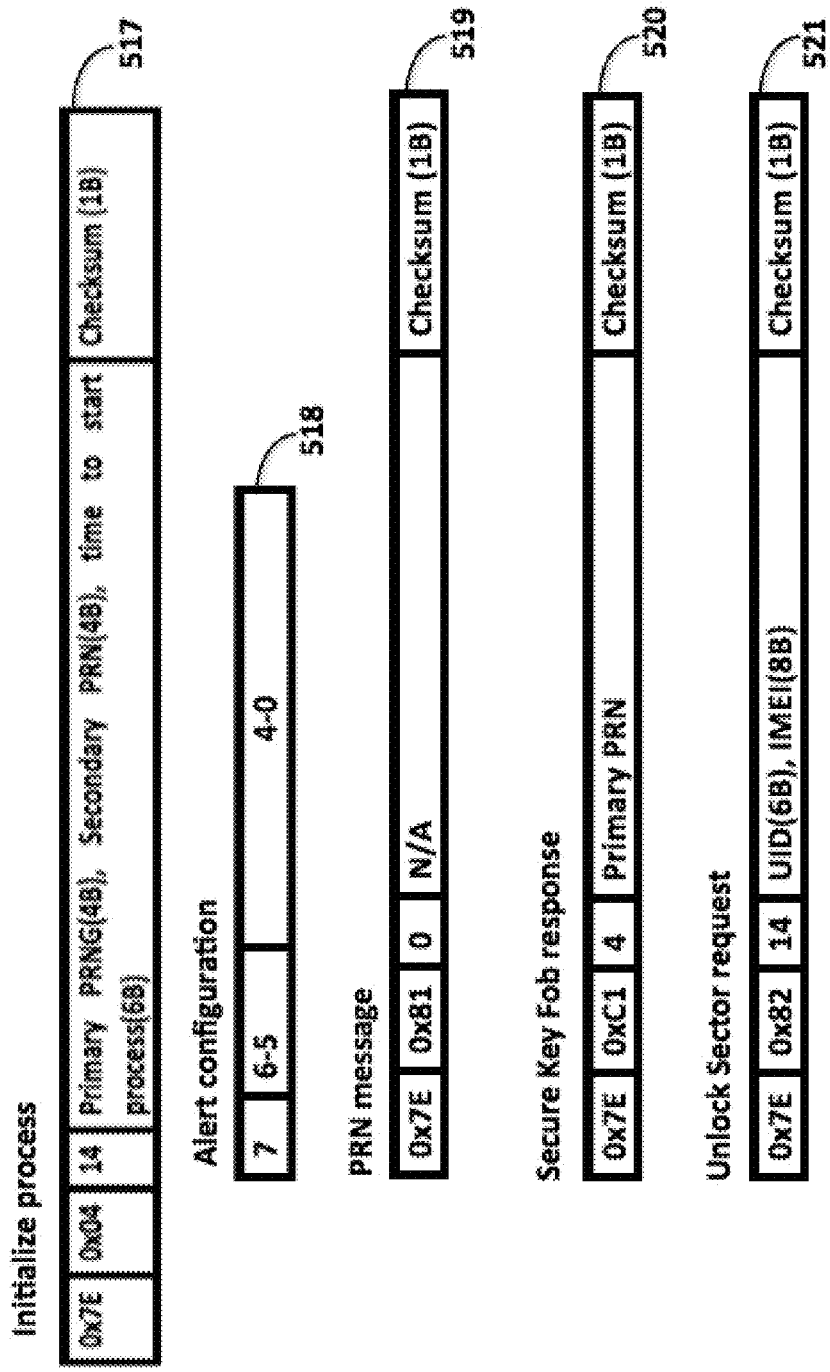
Fig — 5A

SECURE WIRELESS COMMUNICATION DEVICE AND METHOD

PRIORITY CLAIM

This application is a continuation of International Application No. PCT/US2017/000066, filed Mar. 23, 2017, which in turn claims priority to U.S. Provisional Patent Application Ser. No. 62/312,768, filed Mar. 24, 2016, the disclosures of which are incorporated herein by reference in their entireties for all purposes.

FIELD OF THE INVENTION

The present invention relates generally to devices for secure digital communication, and more particularly to devices for secure digital communication that can store and exchange confidential data with a mobile computing device.

BACKGROUND OF THE INVENTION

Near Field Communication (NFC) technology, which operates at 13.56 MHz, allows communication between compatible devices such as key fobs, smartphones, tablets, and phablets that are physically placed within contact or a small distance of one another. Once an NFC connection is established, it can secure the use of other wireless technologies (such as Bluetooth™, Wi-Fi, RFID) and transfers data at up to 424 kbps. The extreme proximity required for this type of wireless connection (due to the limited transmission range of the technology) provides sophisticated security for transactions carried out via NFC-enabled devices.

Mobile devices such as smartphones, personal digital assistants (PDAs), tablets, phablets, pagers, instant messaging devices, and others are often forgotten, lost, or stolen. Existing device loss detection approaches focus primarily on remotely locating or accessing a device after it is lost. This allows prohibiting the device, such as a smartphone, from placing phone calls. It also allows hiding the device owner's information or erasure of sensitive data.

Other methods for tracking and locating lost cell phones include network triangulation and GPS interrogation. These methods do not allow users to automatically and/or instantaneously recover their lost devices.

The most common model for PC application and smartphone login generally relies on a set of username and password that the user enters in a login screen. Once the user name and login are authenticated, the user gains access to the application. This model presents a few security problems.

Multiple users can login with the same username/password. A person can steal a username and password combination without the account owner noticing. The person can login into the system undetected.

For mobile smartphone applications, the smartphone generally goes to sleep mode after one minute to ten minutes of user inaction, and later, the user has to login again. For frequent users of mobile applications, this process is inconvenient and wastes them a lot of time.

In some embodiments, the current invention utilizes features of dynamic NFC electrically erasable programmable memory (EEPROM) and Bluetooth™ on a printed circuit board to provide easy, convenient and secure automatic access to secure specific personal and private data of smartphones thereby increasing security, usability, convenience and efficiency to users while maintaining higher security standards. This new technology also provides multiple sound-emitting alarm alerts when the user smartphone is away from the secure NFC device of the invention, thereby preventing loss and theft of smartphone.

In addition, this present invention use NFC EEPROM and secure software technology with portable electronic devices and wearable devices such as watches, bracelets, and belt buckles. Users of such devices will be able to make payments, transfer data, and send audio and video streams just by bringing one NFC-enabled device within zero to four centimeters of another. Future enhancements allow for endless possibilities, ensuring that NFC will remain a viable and popular technology for years to come.

SUMMARY OF THE INVENTION

The following presents a simplified summary of the disclosure in order to provide a basic understanding to the reader. This summary is not an extensive overview of the disclosure and it does not necessarily identify key/critical elements of the invention or delineate the scope of the invention. Its sole purpose is to present some concepts disclosed herein in a simplified form as a prelude to the more detailed description that is presented later.

The present invention provides a method for secure wireless communication, using a current encryption key, between a secure wireless device and a mobile computing device. The secure wireless device and the mobile computing device each have an NFC interface. Each of the secure wireless device and the mobile computing device has a common seed value stored in the device. The method includes a sequence of steps performed by the secure wireless device.

The first step is the secure wireless device physically contacting the mobile computing device, causing the secure wireless device to switch from non-discoverable mode to discovery mode. The second step is the secure wireless device receiving a pairing request from the mobile computing device, the pairing request including a unique identification code of the mobile computing device. The secure wireless device then validates the pairing request, and if the request is valid, then it performs another sequence of steps, starting with sending a validation request to the mobile computing device via the NFC interface. The validation request includes a secure wireless device ID code. Then, after the mobile computing device has validated the secure wireless device ID code, the secure wireless device receives credentials from the mobile computing device via the NFC interface. Then the secure wireless device validates the credentials and, if they are valid, performs another sequence of steps, starting with designating as the current encryption key an encryption key that was generated in a predetermined manner based on the common seed value. Then the secure wireless device exchanges encrypted messages with the mobile computing device via a wireless interface. Each encrypted message transmitted by the secure wireless device is encrypted by the secure wireless device using the current encryption key. After one of the encrypted messages is transmitted, the current encryption key is replaced with a new encryption key, which is then deemed to be the current encryption key. The new encryption key is generated in a predetermined manner based on the value of the current encryption key and/or the common seed value. Each encrypted message received from the mobile computing device is decryptable by the secure wireless device using the current encryption key.

The NFC interfaces are preferably configured so that the pairing request, the validation request and the credentials can only be received while the secure wireless device is in physical contact with the mobile computing device.

The mobile computing device may generate the common seed value and provide the common seed value to the secure wireless device while the secure wireless device is in physical contact with the mobile computing device. The common seed value may be provided to the secure wireless device by the mobile computing device sending the common seed value with the credentials.

After receiving the pairing request the secure wireless device may switch to non-discoverable mode.

The encrypted messages may be exchanged via Bluetooth.

The unique identification code may include one or more of a mobile smart device International Mobile Equipment Identity (IMEI) number and a media access control (MAC) address.

The current encryption key may be replaced with a new encryption key generated in a predetermined manner based on the value of the current encryption key or the common seed value after each of the messages is transmitted.

The new encryption key may be generated using a value derived from the transmitted message. For example, the value may be a hash of a portion of the transmitted message.

The method may further include the step of the secure wireless device receiving an encrypted message from the mobile computing device comprising a request to provide a confidential data value stored in the secure wireless device. Then the secure wireless device retrieves the confidential data value from a memory and sends an encrypted message to the mobile computing device that includes the confidential data value.

The invention also provides a secure wireless device for securely exchanging messages with an NFC-enabled mobile computing device according to the methods described above. The secure wireless device has an NFC interface, a memory for storing data values, and a computer processor configured to perform the method. The secure wireless device may also include a Bluetooth interface that can be used for exchanging encrypted messages with the mobile computing device.

The invention also provides a secure wireless device for securely exchanging messages with an NFC-enabled mobile computing device using a current encryption key. Each of the secure wireless device and the mobile computing device have a common seed value stored in the device. The secure wireless device includes an NFC interface, a non-volatile memory for storage of confidential data values, and a programmable computer processor running software. When the software is executed by the processor it causes the secure wireless device to perform a number of functions. The secure wireless device enters discovery mode when the device is placed in physical contact with the NFC-enabled mobile computing device. The device is able to receive pairing requests in discovery mode. The device then receives a pairing request from the mobile computing device and in response to the pairing request, sends a validation request to the mobile computing device via the NFC interface. Subsequently, the device receives credentials from the mobile computing device via the NFC interface and validates the credentials. If the credentials are valid then the device designates as the current encryption key an encryption key that was generated in a predetermined manner based on the common seed value and exchanges encrypted messages with the mobile computing device via a wireless interface. The encrypted messages are encrypted by a symmetric encryption algorithm using the current encryption key. After one of the encrypted messages is transmitted, the computer processor may select a new encryption key that was generated in a predetermined manner based on the current encryption key or the common seed value. The new encryption key may then designated to be the current encryption key so that it is used to encrypt the next encrypted message sent to the mobile computing device by the secure wireless device and to decrypt the next message received from the mobile computing device by the secure wireless device. Preferably, after each of the encrypted messages is transmitted, the computer processor selects a new encryption key that was generated in a predetermined manner based on the current encryption key or the common seed value. The new encryption key is then designated to be the current encryption key so that it is used to encrypt the next encrypted message sent to the mobile computing device by the secure wireless device and to decrypt the next message received from the mobile computing device by the secure wireless device.

BRIEF DESCRIPTION OF THE DRAWINGS

FIG. 5 is an illustrative layout of the pairing requests of the secure NFC key fob messages structure.

FIG. 5A shows an illustrative layout of the different types of compact data packet structures used to communicate with the secure NFC key fob.

DETAILED DESCRIPTION OF THE INVENTION

Figure 1:
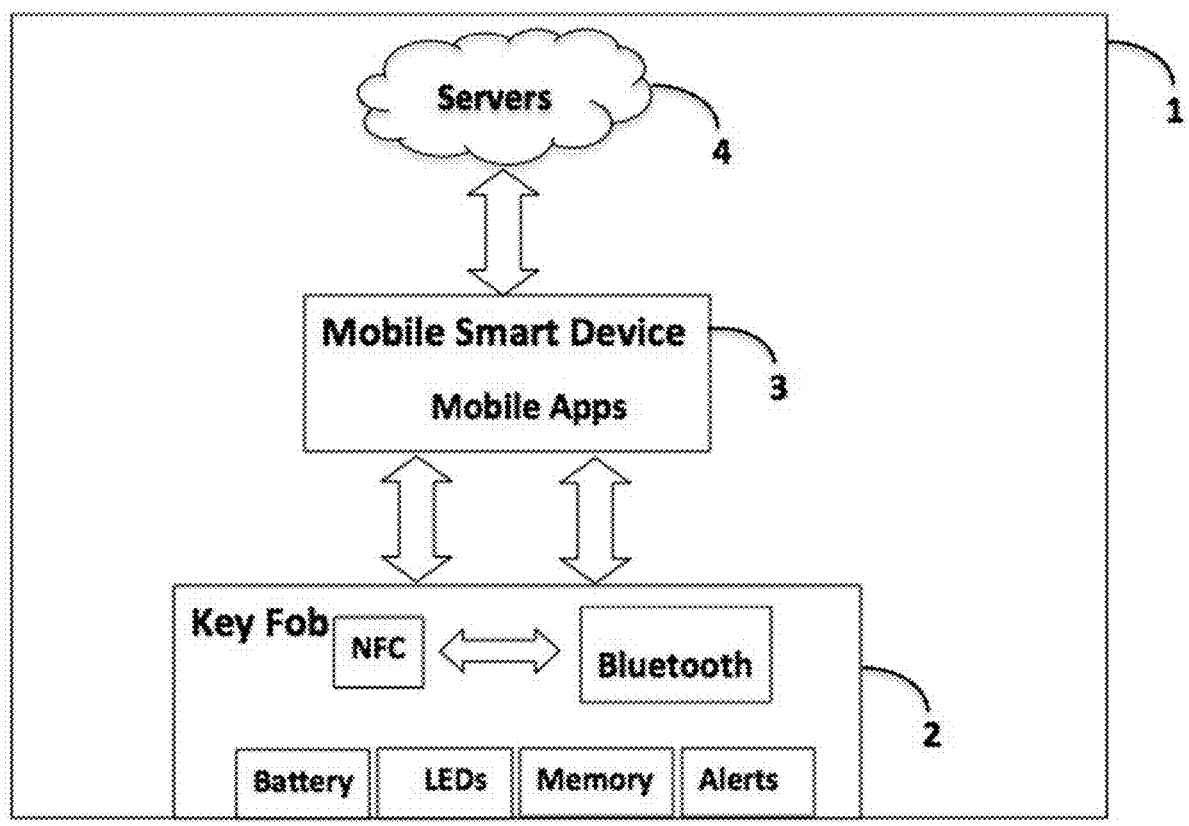
FIG. 1 is a block topology diagram for a mobile system for secure NFC wireless authentication.

In some embodiments, the present invention is a method of establishing and securing a Near Field Communication (NFC) communication link comprising of the steps of establishing a two-way secure wireless connection between a first mobile smart device (also referred to as a mobile computing device) having an NFC function and a second wireless secure NFC key fob communicator device (also referred to as a secure wireless device), wherein the second device is preferably less than 6 cm in any dimension. The second device can pair with a compatible mobile smart device via contact, wherein upon paring with said first mobile smart device, the second device may change mode to a non-discoverable mode (which may be referred to as silent mode). The second wireless device can exchange configuration and session data and can store personal or private user data such as passwords, banking information, credit card information, loyalty card information, personal data files, private data files, and digital keys. Upon receiving a request for configuration and authentication for an NFC secure data exchange, the first mobile smart device sends a request to the second wireless secure NFC key fob communicator device, and the first mobile smart device authenticates, configures and authorizes the NFC secure data exchange if it received the appropriate response from the second wireless device that enables the first device to authorize the NFC secure data exchange and transfer. NFC can also bootstrap other protocols like Wireless networking (WiFi) or Bluetooth™ by exchanging session data and configuration parameters. NFC offers contactless product offerings forms, which enables the first mobile smart device NFC transceiver to read other NFC tags enabling a secure communication method via touch contact.

Establishing and securing a Near Field Communication (NFC) communication link includes the steps of establishing a two-way secure wireless connection via contact between a first mobile smart device having a NFC function and second wireless secure NFC key fob communicator device. The second device has is preferably less than 6 cm in any dimension. The second device can pair with a compatible mobile smart device via touch contact. Upon pairing with the first mobile smart device, the second device changes mode to a non-discoverable mode, and the second wireless programmable device can store personal or private user data obtained from the programmable device in secure flash memory onboard the second wireless key fob communicator device. Upon receiving a request for authenticating a NFC wireless transfer, the first mobile device sends a first request to said second wireless secure NFC device through touch contact. Upon receipt of a first response from the second wireless device, the first mobile device sends a second request to a remote server through GPRS means. Upon receipt of a second response from the remote server, the first mobile device authorizes the NFC secure data transfer if the second response enables the first mobile device to authorize the NFC secure data transfer.

In some embodiments, the invention provides a singular wireless secure NFC key fob communicator device on a printed circuit board including: a flash storage means, a NFC transmitter, a short wireless low energy transceiver, system on chip integrated circuit, light emitting diodes (LEDs) displays and a buzzer and a vibrator to provide alert functions (light, sound-emitting, stimulation) which will be described below. The inertia sensor is an accelerometer. An attachment means may be a key chain, a plastic ring, a bracelet, a metal ring, or a clip. The singular mobile wireless secure NFC key fob communicator device is preferably less than 6 cm in any dimension. The singular wireless secure NFC key fob communicator device can pair with a first mobile smart device through direct contact. The singular wireless secure NFC key fob communicator device can establish a secure two-way wireless connection with a first mobile smart device. Upon pairing through direct contact with a first mobile smart device, the singular wireless secure NFC key fob communicator device can switch to a non-discoverable mode, so that the secure NFC key fob communicator device can send data wirelessly to said first mobile smart device, wirelessly connecting the singular wireless key fob communicator device for flashing or writing or downloading user data onboard the singular wireless secure NFC key fob communicator device. In this way, the user data is selected from group of items consisting of passwords, banking information, credit card information, loyalty card information, personal data files, private data files, a digital key, an encryption key. Upon receipt of a message from the first mobile device for authorizing a secure NFC wireless data transfer, the singular wireless key fob communicator device can send a reply to the first mobile smart device, and the singular wireless secure key fob communicator device can authorize or deny said NFC wireless data transfer.

In a further separate feature of this invention, the combined mobile smart device and secure NFC key fob have a locator function. The secure NFC key fob is provided with both a transmitter and receiver, as is commonly known. The transmitter transmits a signal to the mobile smart device, and the mobile smart device will send back an answering signal for identification purposes. The mobile smart device-based receivers can make an estimate of distance based upon the strength of the signal received from the secure NFC key fob.

FIG. 1 is an example of a block topology for a mobile smart device (3) based mobile system (1) for secure NFC wireless authentication using mobile smart device mobile applications (3) connected to remote servers (4) and a secure NFC key fob (2).

In further detail, still referring to the invention of FIG. 1 an example of such a mobile smart device (3) based mobile system (1) for secure NFC wireless authentication using a secure NFC key fob (2) includes a mobile smart device (3), specific mobile software applications installed on the mobile smart device (3), which is used to communicate with remote servers (4) and directly via contact with the secure NFC key fob (2).

Figure 2:
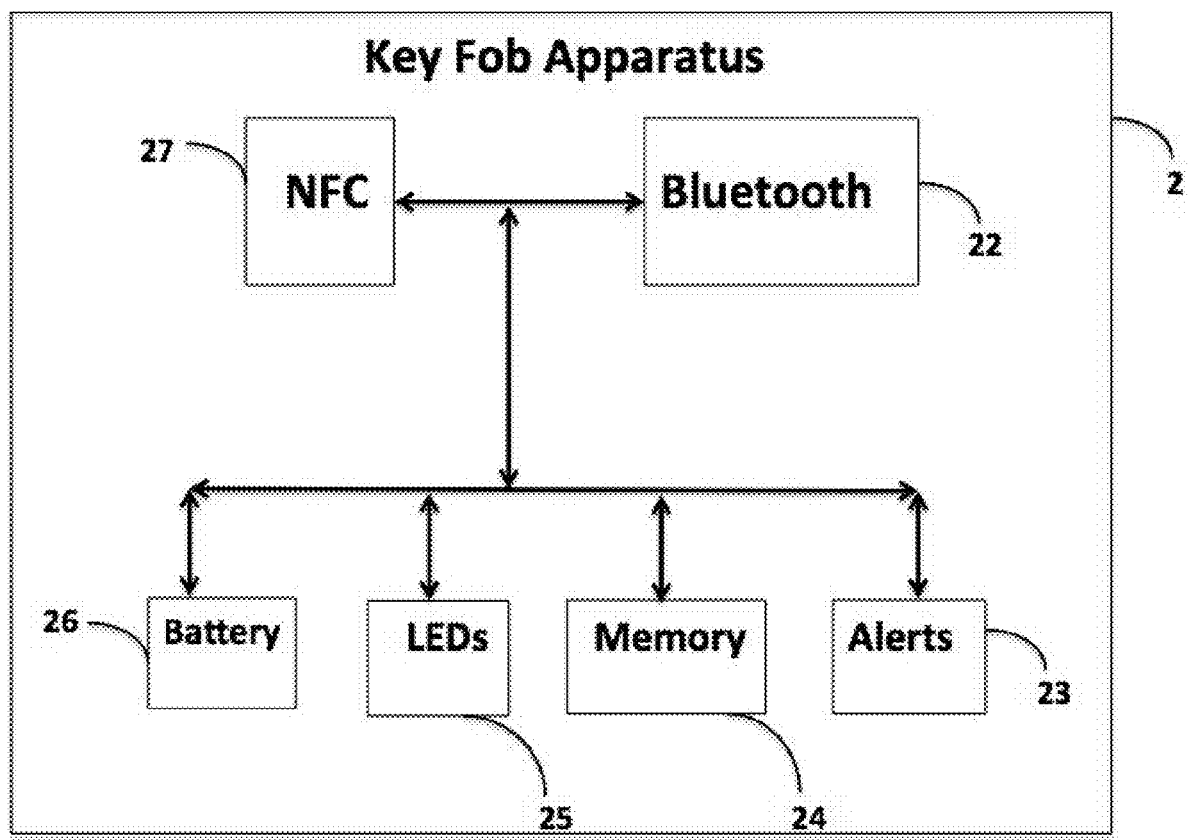
FIG. 2 shows an illustrative hardware diagram of a secure NFC key fob apparatus for secure NFC wireless authentication.

FIG. 2 shows an exemplary illustrative hardware diagram of a secure NFC key fob apparatus for secure NFC wireless authentication of the present invention. A separate NFC circuit chip (27) is associated with other input/or output mobile smart devices and is operably connected to a processing unit used to establish a secure wireless communication.

The secure NFC key fob (2) illustratively can be equipped with battery power from an internal battery (26) source. The secure NFC key fob (2) further illustratively include many different types, shapes and colors of light-emitting diode (LEDs) (25) to given visual clues regarding the state of the secure NFC key fob (2) and its states of interfacing with the mobile smart device (3).

Figure 2A:
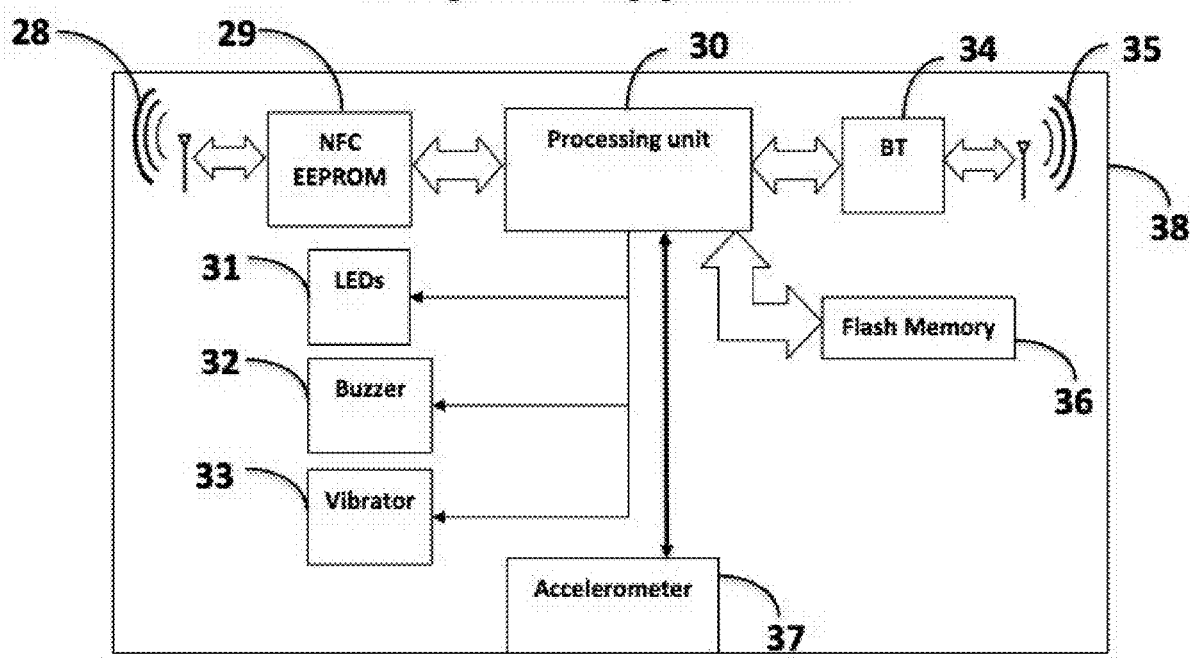
FIG. 2A provides a system block diagram of a secure NFC key fob apparatus hardware and software system.

FIG. 2A shows a system block diagram of a secure NFC key fob apparatus hardware and software system that can be designed on a printed circuit board to execute the secure software of an embodiment. Reference is made in FIG. 2A, wherein a secure NFC key fob apparatus includes a protected cover (38). Inside the protected cover (38) includes a printed circuit board, which includes a NFC EEPROM (29), and antennae (28) for the NFC EEPROM (29), a Bluetooth™ (34) chip and a Bluetooth™ (34) antennae (35). The NFC key fob apparatus also includes a Processing Unit (30) to execute unique and special software programmable instructions, a Programmable flash memory (36) to allow the ease of writs and reads, visual alerts indicators LEDs (31) and Buzzer (32) and Vibrator (33) to provide auditory and sensory feedback based on software and hardware instructions and Accelerometer (37) to provide unique actions to activate software instructions to enable and disable hardware interrupts.

In further detail, still referring to the invention of FIG. 2A, an example of the secure NFC key fob apparatus for secure NFC wireless authentication of the present invention, the processing unit (30) is responsible for securely interfacing between the NFC EEPROM (29) and the Bluetooth™ (34) chip. The Programmable flash memory (36) will allow the user of the apparatus to store data sent via the Mobile Smart device (3).

The construction details of the invention shown in FIG. 2A include that the circuitry will be printed on a circuit board. Further, the various components of the secure NFC key fob apparatus can use hardware components that are available. The various components of the secure NFC key fob apparatus can use software components.

Figure 3:
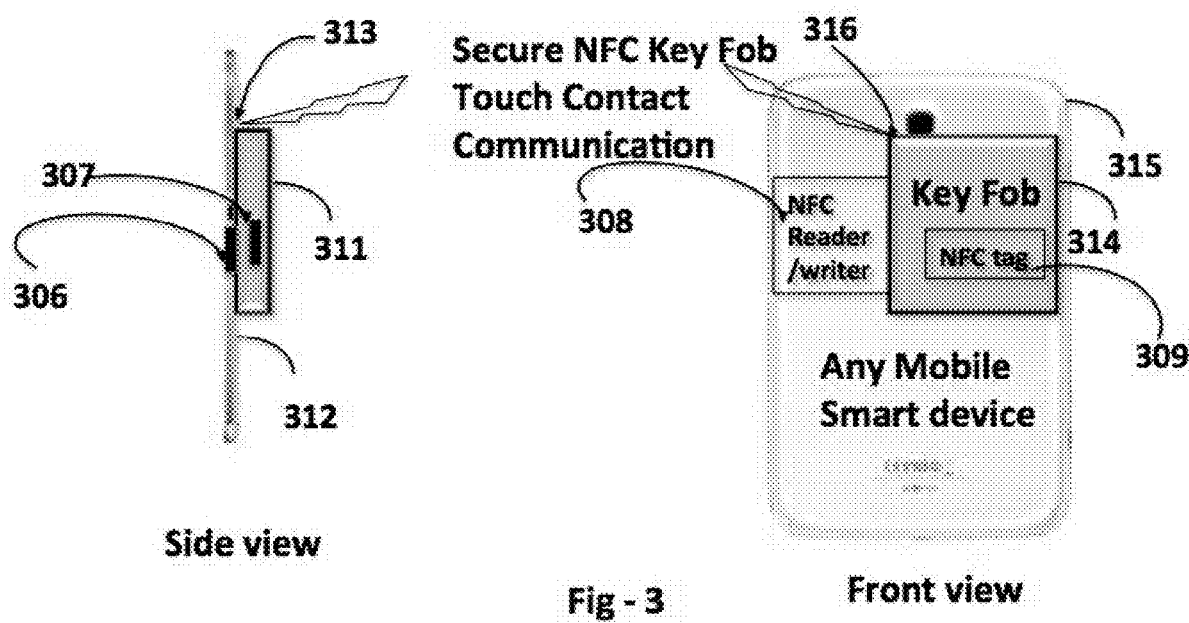
FIG. 3 illustrates a method of making a secure NFC connection via contact.

Referring now to the invention in FIG. 3 of the secure NFC key fob apparatus illustrates a method of making a secure NFC connection via contact with the described embodiments. In order for a mobile smart device user to pair a mobile smart device, such as a mobile smart device (312) (315), to the secure NFC key fob (311) (314), the user must direct touch the secure NFC key fob (311) (314) to the back of the mobile smart device (312) (315). This allows the mobile smart device (312) (315) if it has NFC reader/Writer capability, to read the secure NFC key fob (311) (314) encryption key from the NFC tag (309) (307). Four embodiments of this approach are proposed, where all of them require the NFC tag (307) (309) for passing the secure NFC key fob's encryption key to the mobile smart device (312) (315). The four embodiments disclose different methods of triggering the pairing process; two are implemented in hardware, and two is implemented in an algorithm.

A common factor in the pairing process and methods described herein is that the secure NFC key fob's Bluetooth enabled device, by default, is in non-discoverable mode. This means that the secure NFC key fob's Bluetooth device will not accept any pairing request, regardless of whether another Bluetooth device is transmitting a proper encryption key. The non-discoverable mode, also known as non-discovery mode or silent mode, is used by design in this embodiment to prevent unwanted or unauthorized pairing attempts, or even malicious hacking attempts. Some trigger is needed to cause the secure NFC key fob's embedded NFC and Bluetooth system to temporarily switch to a discovery mode, where NFC and Bluetooth pairing requests may be accepted.

In the front view of the mobile smart device (315) of FIG. 3, the mobile smart device (315) is in direct touch contact communication (316) with the secure NFC key fob apparatus (314). In the side view mobile smart device (312) of FIG. 3, the mobile smart device (312) is in direct touch contact communication (315) with secure NFC key fob apparatus (311). In more detail, still referring to FIG. 3, side view, to ensure direct touch contact of NFC key fob apparatus (311) with mobile smart device (312), there should no space between the NFC key fob apparatus (311) with the mobile smart device (312). In further detail, still referring to the invention of FIG. 3 in either side view or front view, when the NFC key fob apparatus (311) is in direct contact communication with the mobile smart device (312) or the key fob apparatus (314) is in direct contact communication with the mobile smart device (315) respectively, a sound will emit from the mobile smart device (312) (315) to indicate that both key fob apparatus (314) (311) has established direct contact communication with the mobile smart device (312) (315).

Figure 3A:
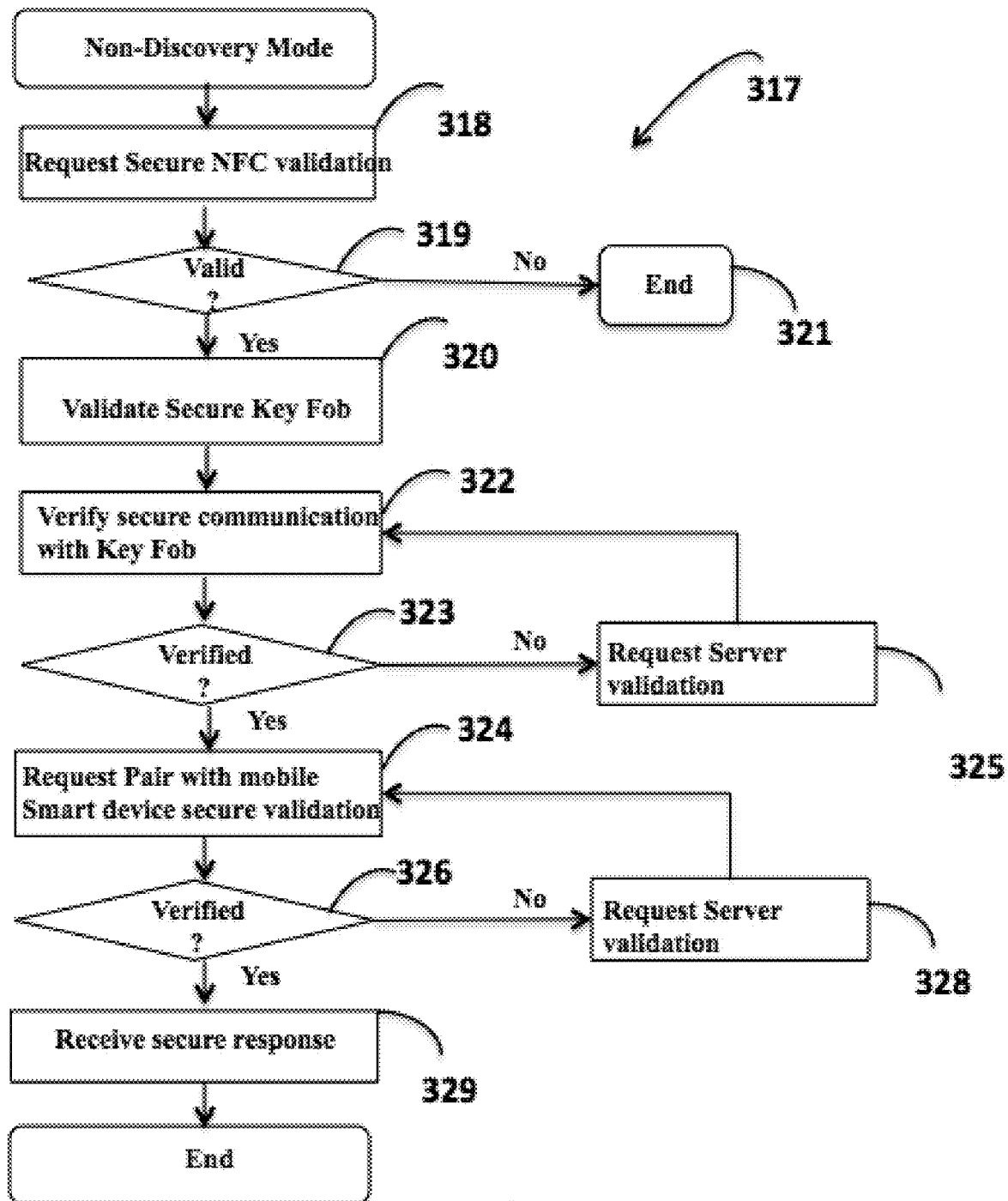
FIG. 3A is an illustrative flowchart of a secure request to a mobile device via secure NFC key fob authentication.

Referring now to FIG. 3A, an illustrative flowchart (317) of the secure communication request between the mobile smart device via the secure NFC key fob apparatus for authentication is shown. In this embodiment, FIG. 3 shows the triggering mechanism is the direct contact between the secure NFC key fob apparatus and the back of the mobile smart device (313) (316). The secure NFC key fob apparatus requests a validation 318 of a mobile smart device. Validation may occur in various methods. For example, the key fob may send a 32-bit message to the mobile smart device. The mobile smart device will be waiting for the specific 32-bit message. If the message that is sent by the key fob is the message that the mobile smart device is expecting, than validation of the key fob (319) will occur and continuation of the validation of the mobile smart device will continue with the key fob. In an alternate illustrative embodiment, the key fob could send a request for validation to the mobile smart device, and the mobile smart device may send pseudo-code to the key fob. The key fob will then determine if the mobile smart device is valid (320). If the mobile smart device is not valid, the key fob will stop communicating with the mobile smart device. However, if the key fob (323) validates the mobile smart device, it may have the ability to communicate with the mobile smart device, such as continue to communicate to further establish secure communication with other validations.

After validation of the mobile smart device (323), the key fob may then verify the data communication with the key fob (324). In one illustrative embodiment, the key fob may verify the communication of the mobile smart device by pinging a data packet to the remote server (325). The server (325) will send a specific data packet to the key fob. The key fob will be expecting the data packet from the server. The data packet may contain a message or code, which will request the key fob to send the data packet, or another data packet, to the remote server (325) containing a specific message or code. If the remote server (325) receives the expected data packet, the communication of the key fob and VCS is verified (326). If the data packet does not ever reach the key fob, or returns the data packet or a new data packet to the remote server (325), or sends a data packet which is not expected, the communication between the remote server (325) and the key fob will not be verified. This may result in the mobile smart device failure to authenticate with the key fob.

The verification of the secure communication link may also be done periodically between the key fob and mobile smart device to ensure that the data communication link is maintained. If the Bluetooth communication link is lost, a visual warning on the mobile smart device will indicate that the Bluetooth connection is lost. Additionally, an indicator on the key fob may light up or display the warning. Further, the mobile smart device or key fob may emit sound to indicate a failure.

The VCS may also request to verify that the cellular or wireless networking ("WiFi") communication link is operational (324). The request (324) may consist of the mobile smart device sending a message to the key fob instructing the key fob to verify the cellular communication link in a similar manner that the data communication or WiFi link of the key fob, mobile smart device and remote server was verified. For example, the key fob may ping data to the remote server. The key fob will send a specific data packet to the remote server. The remote server may be configured to expect the data packet from the key fob. The data packet may contain a message or code which will request the remote server to send the data packet, or another data packet, to the key fob containing a specific message or code. If the key fob receives the expected data packet, the communication of the key fob and the remote server is verified. If the key fob can verify communication with the remote server (328), the key fob may send a response message to the mobile smart device. The mobile smart device will receive the response (329) and verify (326) that a remote server link is established with the key fob, mobile smart device and the remote server.

Figure 3B:
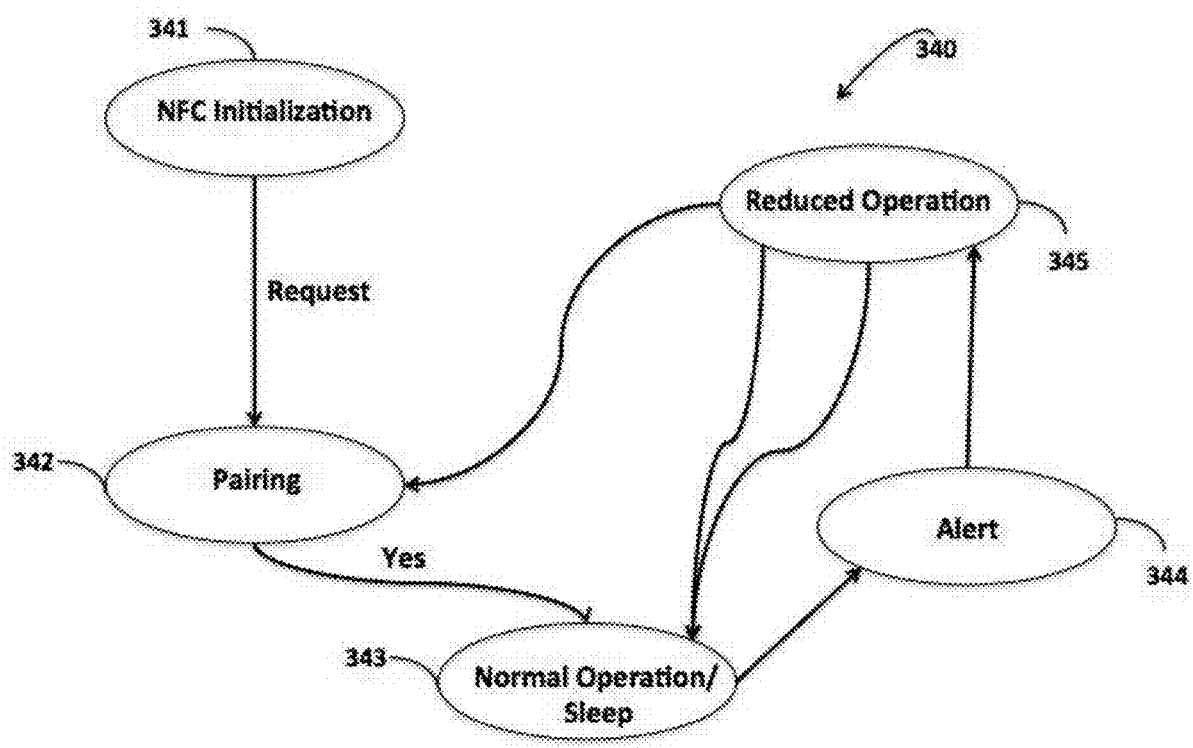
FIG. 3B is an illustrative flow diagram of the respective states of a secure NFC key fob.

FIG. 3B shows an illustrative flow diagram of a system (340) showing one embodiment of the respective states of the secure NFC key fob environment. In this embodiment, secure NFC initialization (341) takes place with the mobile smart device with a pairing (342) request being made by the secure NFC key fob apparatus. When a successful pairing (342) takes place between the secure NFC key fob apparatus and the mobile smart device the process is completed. The mobile smart device is granted access to the secure NFC key fob and the secure NFC key fob enters the state of normal operation (343) or sleep (343). The secure NFC key fob establishes a virtual secure tether with the mobile smart device and will be in either normal operation (343) or sleep (343). The normal operation (343) maintains several tasks, which are all performed on an interrupt basis. These tasks are driven by the Bluetooth connection with its link status information package, NFC communication with reading or writing of data onto the NFC circuit chip, and managing of gestures or taps with the accelerometer. Sleep (343) state will be changed to normal operation (343) by an interrupt generated by these tasks like receiving an NFC message, an accelerometer tap detection, and Bluetooth connection interval servicing and alerts timers. The secure NFC key fob will attempt to go into sleep whenever it idles in order to conserve power. If it is determined that the mobile smart device is beyond the pre-configured distance or range threshold from the secure NFC key fob, the secure NFC key fob uses its LEDs, vibrator and buzzer to give such an alert. If it is determined that the there is the Bluetooth connection interval servicing and alerts timers and the absence of gestures or taps from the accelerometer, then the secure NFC key fob enters into the state of reduced operation (345). In contrast to normal operation (343), the secure NFC key fob can only change its state to reduced operation (345) by receiving interrupts from the NFC circuit chip to initiate a pairing (342) request to restore a lost or broken Bluetooth connection. Many scenarios are possible once the secure NFC key fob is successfully paired and established a virtual tether with the mobile smart device. And the secure NFC key fob using the secure NFC circuit chip technology enables the pairing to be simple, fast and secure One implementation of promoting a secure NFC connection with a four layer security scheme designed using the mobile smart device IMEI number, secure NFC key fob UID number, user name & password and pseudo-random number (PRN) is an illustrative process flow diagram (421) in FIG. 4 which show the main software applications (415) of both the secure NFC key fob (414) and the mobile smart device (415) and its respective application and services to access the interfaces of objects and package interactions of the secure NFC key fob (414). Encryption using AES-128 encryption algorithm on the secure NFC key fob (414) is done automatically by the mobile smart device (415) transceiver before sending the any user data or communication packet. NFC is a short-range (less than 50 mm) communication protocol and is used in the secure NFC key fob (414) apparatus as a more secure medium for exchanging user data.

Figure 4:
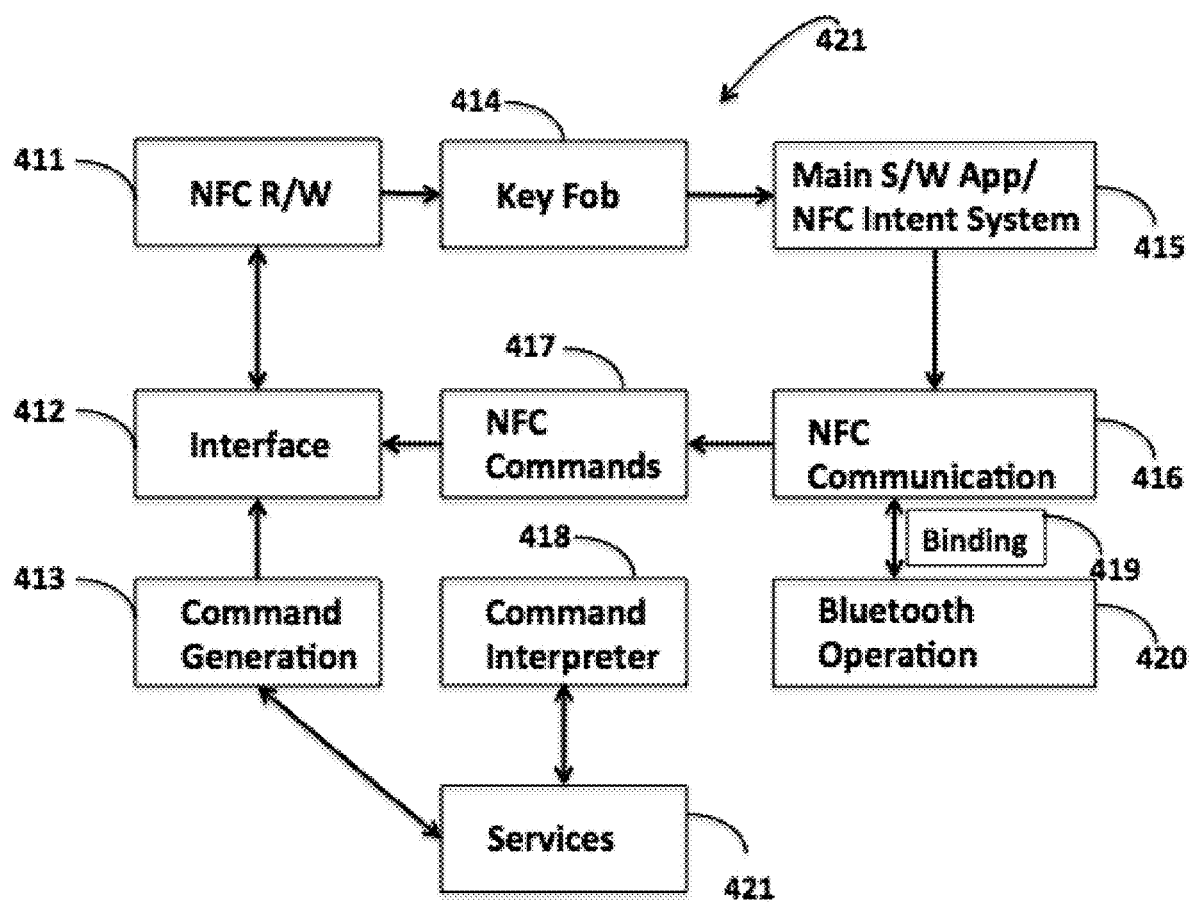
FIG. 4 is an illustrative flow diagram of the main software application and its respective services to access the interface of the secure NFC key fob.

In further details, referring to FIG. 4, NFC communication involves the secure NFC key fob (414) and the mobile smart device (415) exchanging data by writing (411) it to the first sector (Sector 0) of the NFC chip. This block is reserved exclusively for this purpose. After reading an answer from the NFC chip, main software applications (415) must erase the communication block to prevent any unauthorized reading of the packet. The communication between the main software applications (415) and secure NFC key fob (414) is designed on a request/answer basis. This means that whenever main software applications (415) (only main software applications (415) can write requests) writes a request in sector 0, it must wait until secure NFC key fob (414) has processed the request (417) (412) and has written (411) an answer back. No additional writes (411) can be made until an answer is received. The NFC chip memory is divided in 64 sectors (numbered from 0 to 63) of 128 B. Each of these sectors can be individually protected by one of 3 passwords. If a sector is protected by a password, no data may be read from or written to it unless the password, which protects it, is first presented to the NFC chip. The third password is used to protect sector 0 exclusively. The secure NFC key fob (414) system can use the other 2 passwords to protect the data sectors. Once presented, a password is valid until the secure NFC key fob (414) NFC chip is powered down (i.e. there is no more RF field to generate power for the chip). The secure NFC key fob (414) will communicate and accessed by only the respectively paired mobile smart device (415) and are linked for the lifetime of the secure NFC key fob (414). Therefore, only the 3rd password is known to main software applications (415). The 1st and 2nd passwords are only known to the secure NFC key fob (414) itself and are used to protect the remaining 63 sectors. The main software applications (415) must ask for permission to access the data stored in the 63 sectors and is granted access only if it passes the required checks. In order to be granted access, main software applications (415) and its processes of NFC communication (416) with its Binding (419) and Bluetooth Operation (420) must write an Unlock sector request containing the following information: 1. The mobile smart device (415) IMEI code (International Mobile Equipment Identity) and 2. The UID of the secure NFC key fob (414). As soon as the secure NFC key fob (414) determines that the information is correct, it temporarily deactivates the password protection on the 63 sectors, allowing access to the mobile smart device (415), then the main software applications (415) finishes data transfers and the passwords are re-activated. All communication between the mobile smart device main software applications (415) and secure NFC key fob (414) is encrypted using the secondary PRN. The secure NFC key fob (414) must generate a new secondary PRN after each answer it writes to the NFC chip, while main software applications (415) must generate a new secondary PRN after each answer it reads from the NFC chip. The system uses two PRNs to secure communication between the primary PRN of the services (421) and command generation (413) and mobile smart device (415) and the secondary PRN of the mobile smart device (415) and secure NFC key fob (414). The primary PRN must be generated at regular intervals of 15 s. The process, which generates the primary PRN, must be synchronized (and performed concurrently) on the services (421) and the secure NFC key fob (414). The process shall be started in such a way that a new primary PRN is always generated at times of the day that are multiples of 1000 ms (i.e. 00:00:00.000, 00:00:01.000, 00:00:02.000 etc.).

The secondary PRN must be generated regularly to ensure secure communication between the mobile smart device and the secure NFC key fob (414). The process must be synchronized on the mobile smart device and the secure NFC key fob (414) to ensure that the same key used for encryption will be used for decryption also. Therefore, the secure NFC key fob (414) must generate a new one after each answer it writes to the NFC chip (411), while main S/W app (415) must generate a new one after each answer it reads from the NFC chip.

The illustrations of the detailed NFC messaging structure in FIG. 5 shows an illustrative layout of the pairing requests of the secure NFC key fob messages structure. The NFC message format (511) is very specific when communicating with the mobile smart device main s/w app (415) of FIG. 4 by writing packet of data in sector 0 of the start byte (1 B). The message code (512) contains two types of messages: a pairing message and a non-pairing message. The NFC pairing request (513) is required to pair to establish a secure "bond or tether" between the secure NFC key fob with the mobile smart device main s/w app (415) of FIG. 4 and this bonding or tethering can only be done once. When the process is initiated with the NFC pairing request (513) from the secure NFC key fob in direct contact (313) (316) with the mobile smart device (312) (315) as show in FIG. 3 both side view and front view, the secure NFC key fob answers with the NFC pairing answer (514). The NFC pairing request (513) includes data from the Bluetooth MAC address (media access control address) of the mobile smart device, the IMEI number of the mobile smart device, and the type of mobile smart device: 1 for Android™, 2 for iOS™, for BlackBerry™, 4 for Windows™ and F for other. The NFC pairing answer (514) includes the UID of the secure NFC key fob, the Bluetooth MAC address of the secure NFC key fob and the Bluetooth password required to establish a bond.

After the secure bonding or tethering is established between the secure NFC key fob and the mobile smart device, there will be instances when the secure bond or tether will be broken due to prolonged separation, Bluetooth communication failures, blocking of communication Bluetooth signals and this will result in completed a reduced pairing request (515). The reduced pairing request (515) will send the UID of the secure NFC key fob, the IMEI number of the mobile smart device and the type of mobile smart device: 1 for Android™, 2 for iOS™, for BlackBerry™, 4 for Windows™ and F for other required to re-establish a bond between the with the secure NFC key fob and the mobile smart device. The NFC pairing answer (514) to the includes the UID of the secure NFC key fob, the Bluetooth MAC address of the secure NFC key fob and the Bluetooth password required to re-establish the bond.

What would happen if a user loses or have their mobile smart device stolen? The secure NFC key fob apparatus has a built-in function to receive a request from another mobile smart device using the advanced pairing request (516). The message format of the advanced pairing request (516) includes the UID of the secure NFC key fob, the IMEI of the lost or stolen mobile smart device that was used to pair with the respective secure NFC key fob, the IMEI of the new mobile smart device, the Bluetooth MAC address of the new mobile smart device, the OTRK sent by the server (4) shown in FIG. 1 and the type of the mobile smart device.

Referring now to FIG. 5A, which shows an illustrative layout of the different types of compact data packet structures used to communicate with the secure NFC key fob which will setup the services to be executed on the secure NFC key fob. The initialize process (517) on the secure NFC key fob is required for the last step of the pairing process to ensure that the secure NFC key fob will successfully be bonded or tethered and secured. The data packet of the initialize process (517) includes the primary PRN, the secondary PRN, and the time to start the initialize process as show in NFC initialization (341) in FIG. 3B. In order to conserve size, the data for data configuration packets as shown in the alert configuration (518) follows a strict guideline which includes:

Bit 7: 1 for Alert config
Bit 6-5: 00 for LED alert configuration
  01 for Buzzer configuration
  10 for Vibrator configuration
Bit 4-0: 0x00—alert is off
  0x01—alert is pulsing fast
  0x02—alert is pulsing at medium speed
  0x03—alert is pulsing slowly
  0x04—alert is pulsing very slowly
  0x0F—alert is on all the time (not recommended)

Once the secure NFC key fob apparatus is successfully initialized, the main software application on the mobile smart device must decrypt all packets from the servers (4) as shown in FIG. 1 using the primary PRN message (519) of the secure NFC key fob. The PRN message (519) of the secure NFC key fob includes a 4 byte number, which will be requested by the mobile smart device. To ensure a successful decryption of the packets, the secure NFC key fob sends a response (520) with the secure NFC key fob primary PRN.

The present embodiment of the secure NFC key fob apparatus has a NFC chip which has 64 Kbit of storage (other embodiments can have a smaller amount or larger amount of storage), out of which only 128 B (1 sector) are reserved for communication between the secure NFC key fob and the mobile smart device which would result in the rest of the memory (63 sectors) being used to store user data as described in this embodiment. User data stored in any of the 63 sectors is protected by one of the 2 remaining passwords. Therefore, secure data cannot be read from or written to the NFC chip unless the password is presented as shown in the unlock sector request (521). This adds a layer of security to the data stored in the NFC chip.

Figure 6:
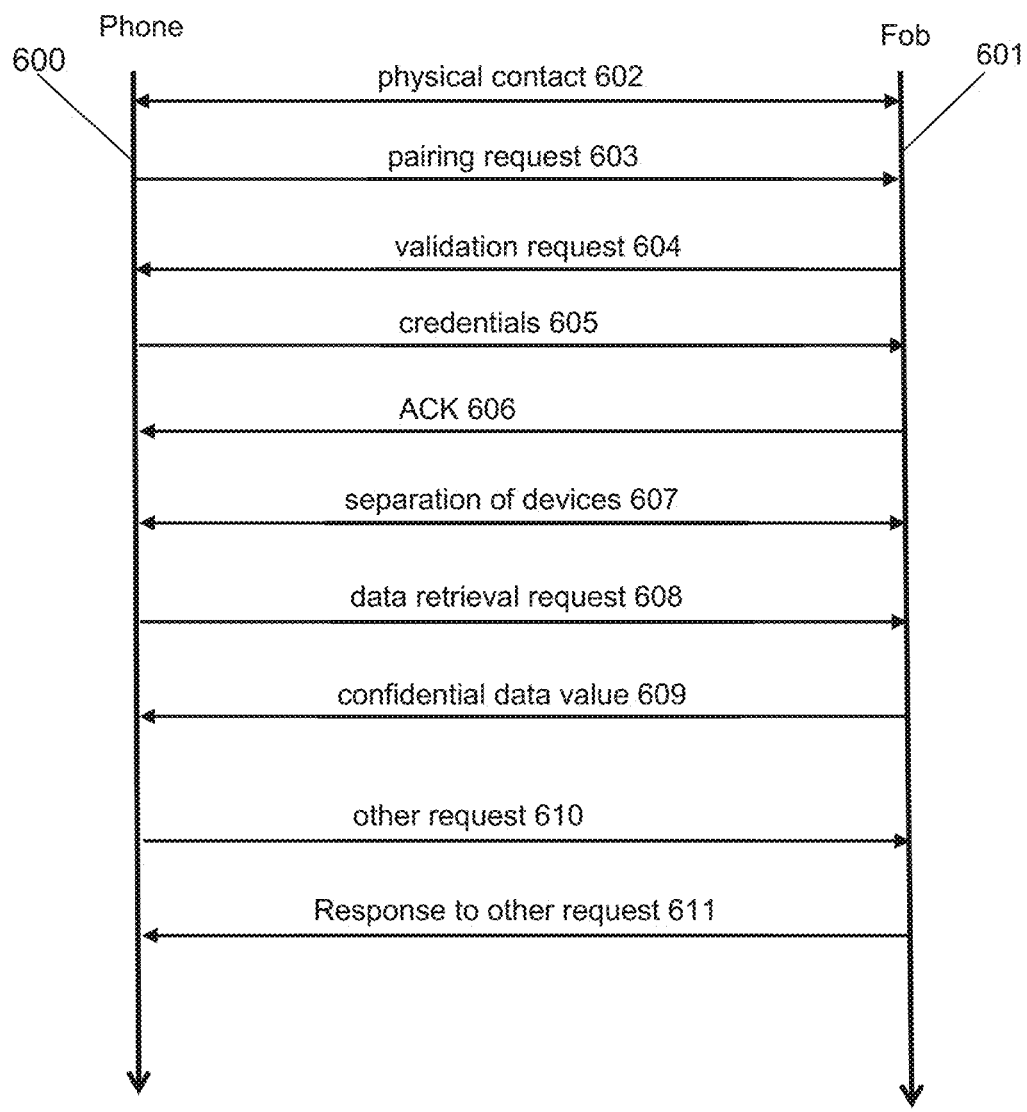
FIG. 6 shows an example time sequence of interactions between a secure NFC key fob and a smartphone.

Turning now to FIG. 6, certain preferred embodiments will be further described. FIG. 6 shows timelines 600, 601 with time increasing from the top of each vertical line to the bottom. The time scale is not intended to be linear and FIG. 6 is not intended to show all relevant communications, but rather only key communication events that are particularly relevant to the present invention. The left vertical line 600 represents a smartphone, which is one example of the more general class of mobile computing devices, which also includes devices such as tablets, laptop computers and other portable devices with a computer processor. The right vertical line 601 represents an NFC key fob, which is a preferred embodiment of a secure wireless device in accordance with the present invention. As discussed above, it is preferred that the secure wireless device be relatively small, such as less than 6 cm in any dimension, so a key fob is a preferred embodiment. The horizontal lines depict events including electronic messages sent over a wireless interface using NFC and possibly other wireless technology such as Bluetooth. In this context "NFC" means any near field communication technology that permits wireless communication between the secure wireless device and the mobile computing device, and which is configured so that communication is only possible if the devices are in direct physical contact with each other. It should be noted that the actions of the phone discussed below are generally controlled by a special software application (or "app") running on the phone that is designed to communicate with secure wireless devices according to the present invention. Herein, the app and the phone are referred to synonymously. Of course, the functionality could also be provided by a custom processor in the phone, but this is not preferred.

Initially the fob is in non-discoverable mode, meaning that it will not accept pairing requests from any device. When the fob is brought into physical contact with the phone 602, the fob switches to discovery mode, in which it can receive pairing requests. This may be done, for example, by the NFC interface in the phone transmitting energy to an NFC tag in the fob and thereby activating it. After the fob is in discovery mode, the phone sends a pairing request 603 to the fob to initiate NFC pairing of the devices. The pairing request 603 generally includes a unique identification code of the mobile computing device. The unique identification code may be, for example, a mobile smart device International Mobile Equipment Identity (IMEI) number or a media access control (MAC) address, such as a Bluetooth MAC address of the mobile computing device, or it may be a combination of such identifiers.

The fob then validates the pairing request. Validation may simply involve confirming that the pairing request is correctly formatted, but preferably it includes confirming that the secure wireless device ID code is a valid secure wireless device ID code for a device that the fob has been configured to allow pairing with. For example, the fob may be set up initially to store the IMEI number of phones it is allowed to pair with, and then validation may include verifying that the pairing request includes one of the IMEI numbers recorded by the fob that it is permitted to pair with. If the pairing request is not valid, then the fob will simply switch back to non-discoverable mode and not communicate with the phone. If physical contact between the fob and phone is discontinued, the fob may then also switch into non-discoverable mode.

If the pairing request is found to be valid, then the fob responds to the pairing request by sending a validation request 604 (which may alternately be referred to as a pairing answer), which includes a secure wireless device ID code. The device ID code may be, for example, the fob UID and/or the fob Bluetooth MAC address. The phone then validates the validation request, for example, by comparing the secure wireless device ID code with a list of secure wireless device ID codes stored in its memory that it has been authorized to communicate with.

After the phone has validated the secure wireless device ID code, it sends a message to the fob via NFC, while the phone remains in physical contact with the fob, including credentials 605 via the NFC interface. The credentials 605 may include, for example, a user name and password. The fob has in its memory credentials of a user or users allowed to access data stored in the fob. For example, for a given phone with an IMEI number stored in the fob, the fob may also store the user name and password of one or more users of the phone. Passwords are preferably stored only in hashed form so that the fob checks a password by comparing a hash of the password provided in the credential with a stored hash of a password of an authorized user.

It is essential to the invention that the fob and the phone each have a common seed value stored in their memories. This could be done during an initial configuration process, when information such as authorized mobile devices, user names and passwords are first obtained and stored by the fob, but preferably the common seed value is generated when pairing is being done and provided to the fob securely, such as by NFC when the devices are in direct physical contact. In preferred embodiments, the phone provides the common seed value to the fob during the pairing process, such as by sending it along with the credentials 605. Alternately the fob may generate the common seed value and securely provide it to the phone. The common seed value is generally a pseudo-random number which may be calculated using a known pseudo-random number generation algorithm based on information such as the current system time or the temperature of the device.

After the credentials have been validated by the fob, the fob may acknowledge 606 that the credential are valid by sending a message 606 to the phone. The app on the phone may then confirm to the user that pairing has been completed. At that point the phone and fob may be physically separated 607 and a suitable wireless protocol such as Bluetooth can be used for transmitting securely encrypted messages.

The fob generates an encryption key using the common seed value. The key generation is done by a predetermined algorithm known by both the phone and the fob. This key is then designated as the "current encryption key". The phone also generates the same current encryption key using the common seed value and the predetermined algorithm. In some embodiments, the initial encryption key may simply be the common seed value (so that the predetermined algorithm is the identity function), but it is preferred that a suitable algorithm is used to generate the key, where the particular algorithm used is not publicly disclosed by the provider of the fob and the app running on the phone that generates the key. Many such algorithms are known.

Then, the fob and phone are paired and configured to exchange secure encrypted messages using the current encryption key. They use the same, pre-determined, symmetric encryption algorithm such as Rijndael or Blowfish using the same, pre-determined, parameters, such as block size. The messages may be transmitted using any suitable wireless interface supported by both devices, such as NFC or Bluetooth. An example of a message is a data retrieval request 608 sent by the phone requesting, for example, login credentials for a specific bank account that are stored in the fob. The fob decrypts the message using the current encryption key and parses the message to identify the data that is being requested. It then retrieves the requested data from memory and decrypts it if required (note that the current encryption key is not relevant to this decryption, which encryption/decryption may be done in any suitable manner), and then assembles a responding message including the bank account information. The fob then encrypts the message using the current encryption key and transmits the encrypted message containing the confidential data value 609, which includes the requested banking information, to the phone. The phone receives the message and decrypts the message using the current encryption key and then parses the message to extract the bank account information. The app on the phone may then, for example, use this information to log the phone user into a banking site via a browser running on the phone and delete the information from the phone. The devices may exchange multiple sequences of encrypted messages such as the other request 610 shown in FIG. 6 and the response to other request 611. After some period with no messages being sent to the fob, the fob may then return to non-discoverable mode.

For greater security it is preferred that the current encryption key be updated once or more. For example, at a certain point, such as after sending the first encrypted message to the phone, the fob may generate a new encryption key based on the current encryption key and/or the common seed value and then designate that new encryption key to be the current encryption key. The new key is generated using a predetermined algorithm known to both the phone and the fob. In that case the app on the phone is configured to also generate the same new encryption key and replace the current encryption key with new current encryption key after the previous current encryption key has been used to decrypt the encrypted message. This key regeneration may be done once, or be done periodically on a predetermined schedule, for example. In some preferred embodiments, a new encryption key is generated and replaces the current encryption key after every message is sent by the fob, and after every message is received by the phone. Note that, of course, the actual generation of a new encryption key does not necessarily need to be done at a specific point in response to or in relation to transmitting or receiving a message; rather it just need to be done prior to replacing the current encryption key. For example, in some embodiments a sequence of keys may be computed by one or both devices as soon as the common seed value is known to each device.

Generally the key generation is done using a known pseudo-random number generator. Typically this is done starting with a seed value, which in this case could be, for example, the current encryption key or some function of the current encryption key and/or the common seed value.

For greater security, new encryption keys may be generated using a value derived from the transmitted message. For example, the new key may be a generated from a seed value that includes a hash of the message or a portion of the message. Such an approach provides a degree of extra security in cases where the common seed value may somehow become compromised.

The invention also includes systems including the secure wireless device described above and a mobile computing device. The mobile computing device is typically a smartphone running a special app that facilitates pairing and communication with the secure wireless device. The app is configured to process the messages received from the secure wireless device as described above and to assemble and send messages to the secure wireless device as described above. The app initially generates the current encryption key using the same predetermined algorithm as the secure wireless device based on the common seed value. In some preferred embodiments, the app computes or designates a new encryption key, generated using the same predetermined algorithm used by the secure wireless device, after each encrypted message is received from the secure wireless device and decrypted using the previous current encryption key.

While it is strongly preferred that the NFC interface be configured so that the pairing request 603, validation request 604, common seed value and credentials 605 can only be received while the devices are in direct physical contact, in some embodiments, the NFC interface may allow communication between the devices when they are in close proximity.

Generally, a computer, computer system, computing device, client or server, as will be well understood by a person skilled in the art, includes one or more than one electronic computer processor, and may include separate memory, and one or more input and/or output (I/O) devices (or peripherals) that are in electronic communication with the one or more processor(s). The electronic communication may be facilitated by, for example, one or more busses, or other wired or wireless connections. In the case of multiple processors, the processors may be tightly coupled, e.g. by high-speed busses, or loosely coupled, e.g. by being connected by a wide-area network.

A computer processor, or just "processor", is a hardware device for performing digital computations. It is the express intent of the inventors that a "processor" does not include a human; rather it is limited to be an electronic device, or devices, that perform digital computations. A programmable processor is adapted to execute software, which is typically stored in a computer-readable memory. Processors are generally semiconductor based microprocessors, in the form of microchips or chip sets. Processors may alternatively be completely implemented in hardware, with hard-wired functionality, or in a hybrid device, such as field-programmable gate arrays or programmable logic arrays. Processors may be general-purpose or special-purpose off-the-shelf commercial products, or customized application-specific integrated circuits (ASICs). Unless otherwise stated, or required in the context, any reference to software running on a programmable processor shall be understood to include purpose-built hardware that implements all the stated software functions completely in hardware.

Computer-readable memory, which may also be referred to as a computer-readable medium or a computer-readable storage medium, which terms have identical (equivalent) meanings herein, can include any one or a combination of non-transitory, tangible memory elements, such as random access memory (RAM), which may be DRAM, SRAM, SDRAM, etc., and nonvolatile memory elements, such as a ROM, PROM, FPROM, OTP NVM, EPROM, EEPROM, hard disk drive, solid state disk, magnetic tape, CDROM, DVD, etc.) Memory may employ electronic, magnetic, optical, and/or other technologies, but excludes transitory propagating signals so that all references to computer-readable memory exclude transitory propagating signals. Memory may be distributed such that at least two components are remote from one another, but are still all accessible by one or more processors. A nonvolatile computer-readable memory refers to a computer-readable memory (and equivalent terms) that can retain information stored in the memory when it is not powered. A computer-readable memory is a physical, tangible object that is a composition of matter. The storage of data, which may be computer instructions, or software, in a computer-readable memory physically transforms that computer-readable memory by physically modifying it to store the data or software that can later be read and used to cause a processor to perform the functions specified by the software or to otherwise make the data available for use by the processor. In the case of software, the executable instructions are thereby tangibly embodied on the computer-readable memory. It is the express intent of the inventor that in any claim to a computer-readable memory, the computer-readable memory, being a physical object that has been transformed to record the elements recited as being stored thereon, is an essential element of the claim.

Software may include one or more separate computer programs configured to provide a sequence, or a plurality of sequences, of instructions to one or more processors to cause the processors to perform computations, control other devices, receive input, send output, etc.

It is intended that the invention includes computer-readable memory containing any or all of the software described herein. In particular, the invention includes such software stored on non-volatile computer-readable memory that may be used to distribute or sell embodiments of the invention or parts thereof.

The abbreviation cm as used herein refers to centimetres (or in the US, "centimeters").

It should be understood that the above-described embodiments of the present invention, particularly, any "preferred" embodiments, are only examples of implementations, merely set forth for a clear understanding of the principles of the invention. Many variations and modifications may be made to the above-described embodiment(s) of the invention as will be evident to those skilled in the art. That is, persons skilled in the art will appreciate and understand that such modifications and variations are, or will be, possible to utilize and carry out the teachings of the invention described herein.

Where, in this document, a list of one or more items is prefaced by the expression "such as" or "including", is followed by the abbreviation "etc.", or is prefaced or followed by the expression "for example", or "e.g.", this is done to expressly convey and emphasize that the list is not exhaustive, irrespective of the length of the list. The absence of such an expression, or another similar expression, is in no way intended to imply that a list is exhaustive. Unless otherwise expressly stated or clearly implied, such lists shall be read to include all comparable or equivalent variations of the listed item(s), and alternatives to the item(s), in the list that a skilled person would understand would be suitable for the purpose that the one or more items are listed.

The words "comprises" and "comprising", when used in this specification and the claims, are used to specify the presence of stated features, elements, integers, steps or components, and do not preclude, nor imply the necessity for, the presence or addition of one or more other features, elements, integers, steps, components or groups thereof.

The scope of the claims that follow is not limited by the embodiments set forth in the description. The claims should be given the broadest purposive construction consistent with the description and figures as a whole.

What is claimed is:

1. A method for secure wireless communication using a current encryption key between a secure wireless device and a mobile computing device, the secure wireless device and the mobile computing device each comprising an NFC interface, each of the secure wireless device and the mobile computing device having a stored common seed value, the method comprising the secure wireless device performing the steps of:
   physically contacting the mobile computing device;
   switching from non-discoverable mode to discovery mode after the secure wireless device has contacted the mobile computing device;
   receiving a pairing request from the mobile computing device, the pairing request including a unique identification code of the mobile computing device;
   validating the pairing request;
   if the pairing request is valid:
   sending a validation request to the mobile computing device via the NFC interface, the validation request comprising a secure wireless device ID code;
   after the mobile computing device has validated the secure wireless device ID code, receiving credentials from the mobile computing device via the NFC interface;
   validating the credentials; and
   if the credentials are valid:
   designating as a current encryption key an encryption key that was generated in a predetermined manner based on a common seed value; and
   exchanging encrypted messages with the mobile computing device via a wireless interface, wherein each encrypted message transmitted by the secure wireless device is encrypted by the secure wireless device using the current encryption key, and after one of the encrypted messages is transmitted, the current encryption key is replaced with a new encryption key generated in a predetermined manner based on the current encryption key or the common seed value;
   and wherein each encrypted message received from the mobile computing device is decrypted by the secure wireless device using the current encryption key;
   wherein the mobile computing device generates the common seed value and provides the common seed value to the secure wireless device while the secure wireless device is in physical contact with the mobile computing device, and wherein the common seed value is provided to the secure wireless device by the mobile computing device sending the common seed value with the credentials.

2. The method of claim 1, wherein the NFC interfaces are configured to receive the pairing request, the validation request and the credentials only when the secure wireless device is in physical contact with the mobile computing device.

3. The method of claim 1, wherein after receiving the pairing request the secure wireless device switches to non-discoverable mode.

4. The method of claim 1, wherein the encrypted messages are exchanged via Bluetooth.

5. The method of claim 1, wherein the unique identification code comprises a mobile smart device International Mobile Equipment Identity (IMEI) number or a media access control (MAC) address.

6. The method of claim 1, wherein the current encryption key is replaced with a new encryption key generated in a predetermined manner based on the current encryption key or the common seed value after each of the messages is transmitted.

7. The method of claim 1, wherein the new encryption key is generated using a value derived from the transmitted message.

8. The method of claim 7, wherein the value is a hash of a portion of the transmitted message.

9. The method of claim 1, wherein exchanging encrypted messages comprises steps of:
   receiving an encrypted message from the mobile computing device comprising a request to provide a confidential data value stored in the secure wireless device;
   retrieving the confidential data value from a memory; and
   sending an encrypted message to the mobile computing device, the encrypted message including the confidential data value.

10. A secure wireless device for securely exchanging messages using a current encryption key with an NFC-enabled mobile computing device, each of the secure wireless device and the mobile computing device having a stored common seed value, the secure wireless device comprising:
   an NFC interface;
   memory;
   a computer processor configured to:
   operate in a non-discoverable mode in which the device will not accept a pairing request;
   switch from non-discoverable mode to discovery mode when the device is placed in physical contact with the NFC-enabled mobile computing device;
   when in discovery mode, receive a pairing request from the mobile computing device, the pairing request including a unique identification code of the mobile computing device;
   validate the pairing request;
   if the pairing request is valid:
   send a validation request to the mobile computing device via the NFC interface, the validation request comprising a secure wireless device ID code;
   after the mobile computing device has validated the secure wireless device ID code, receive credentials from the mobile computing device via the NFC interface;
   validate the credentials; and
   if the credentials are valid:
   designate as a current encryption key an encryption key that was generated in a predetermined manner based on the common seed value; and exchange encrypted messages with the mobile computing device via a wireless interface, wherein each encrypted message transmitted by the secure wireless device is encrypted by the secure wireless device using the current encryption key, and after one of the encrypted messages is transmitted, the current encryption key is replaced with a new encryption key generated in a predetermined manner based on the current encryption key or the common seed value;

and wherein each encrypted message received from the mobile computing device is decrypted by the secure wireless device using the current encryption key;

wherein the mobile computing device generates the common seed value and provides the common seed value to the secure wireless device while the secure wireless device is in physical contact with the mobile computing device, and wherein the common seed value is provided to the secure wireless device by the mobile computing device sending the common seed value with the credentials.

11. The secure wireless device of claim 10, wherein the NFC interfaces are configured to receive the pairing request, the validation request and the credentials only when the secure wireless device is in physical contact with the mobile computing device.

12. The secure wireless device of claim 10, wherein the secure wireless device is packaged as a secure NFC key fob apparatus hardware.

13. The secure wireless device of claim 10, wherein the current encryption key is replaced with a new encryption key generated in a predetermined manner based on the current encryption key or the common seed value after each of the messages is transmitted.

14. The secure wireless device of claim 10, wherein exchanging encrypted messages comprises:

receiving an encrypted message from the mobile computing device comprising a request to provide a confidential data value stored in the secure wireless device;

retrieving the confidential data value from the memory; and sending an encrypted message to the mobile computing device, the encrypted message including the confidential data value.

* * * * *